United States Patent
Akamatsu et al.

(10) Patent No.: US 6,338,905 B1
(45) Date of Patent: Jan. 15, 2002

(54) GLASS PLATE WITH WATER-REPELLENT FILM AND METHOD FOR PRODUCING SAME

(75) Inventors: Yoshinori Akamatsu; Akira Yuasa; Hideki Yamamoto, all of Mie (JP)

(73) Assignee: Central Glass Company, Limited, Ube (JP)

(*) Notice: Subject to any disclaimer, the term of this patent is extended or adjusted under 35 U.S.C. 154(b) by 0 days.

(21) Appl. No.: 08/892,895

(22) Filed: Jul. 15, 1997

(51) Int. Cl.[7] .............................................. B32B 17/00
(52) U.S. Cl. ...................... 428/428; 428/432; 428/446; 65/60.5; 65/60.52; 65/60.8
(58) Field of Search ................................. 428/428, 432, 428/426, 446; 65/60.5, 60.52, 60.8

(56) References Cited

U.S. PATENT DOCUMENTS

| | | | |
|---|---|---|---|
| 5,250,322 A | * 10/1993 | Takahashi | 427/426 |
| 5,314,731 A | 5/1994 | Yoneda et al. | 428/429 |
| 5,328,768 A | * 7/1994 | Goodwin | 428/428 |
| 5,413,865 A | * 5/1995 | Nakamura | 428/432 |
| 5,415,927 A | * 5/1995 | Hirayama | 428/307.3 |
| 5,464,704 A | 11/1995 | Yoneda et al. | 428/429 |
| 5,645,939 A | 7/1997 | Yoneda et al. | 428/429 |
| 5,733,660 A | * 3/1998 | Makita | 428/426 |

FOREIGN PATENT DOCUMENTS

| | | |
|---|---|---|
| EP | 0513690 | 11/1992 |
| EP | 0535691 | 4/1993 |
| EP | 0545201 | 6/1993 |
| EP | 0624404 | 11/1994 |
| EP | 0658525 | 6/1995 |
| JP | 60-219234 | 11/1985 |
| JP | 2-25990 | 1/1990 |
| JP | 4-342443 | 11/1992 |
| JP | 6-184527 | 7/1996 |

OTHER PUBLICATIONS

Abstract of JP59–039714, Mar. 5, 1984, vol. 008, No. 126 (C–228), Jun. 13, 1984.
Abstract of JP06–184527, Jul. 5, 1994, vol. 018, No. 533 (C–1259), Oct. 11, 1994.
English translation of Hayashi et al., (1994) Journal of the Ceramic Society of Japan, 102 (2), pp. 206–209 (No month).
Hayashi et al., (1994) *Journal of the Ceramic Society of Japan*, 102 (2) pp. 206–209. (No month).
Weast, Robert C., ed., CRC Handbook of Chemistry and Physics, p. F–55, 1979.

* cited by examiner

Primary Examiner—Timothy M. Speer
Assistant Examiner—Michael LaVilla
(74) Attorney, Agent, or Firm—Crowell & Moring LLP

(57) ABSTRACT

The invention relates to a water-repellent glass plate having a glass substrate; a first film which is formed on the glass substrate and is made of silica; and a water-repellent second film formed on the first film. This glass plate is prepared by a method including steps of: (1) applying a first coating liquid containing tetraisocyanate silane to the glass substrate, thereby to form thereon a precursory film; and (2) subjecting the precursory film to a drying at room temperature or to a heat treatment, thereby to prepare the first film; and (3) applying a second coating liquid to the first film, thereby to form the second film on the first film. The tetraisocyanate silane of the step (1) is curable at room temperature. The second coating liquid contains an alkoxysilane having at least one fluorocarbon group substituted for at least one hydrogen atom thereof. By the provision of the first film, the water-repellent second film becomes superior in solar resistance, abrasion resistance, chemical resistance, and adhesion to the glass substrate.

19 Claims, 2 Drawing Sheets

GLASS PLATE WITH WATER-REPELLENT FILM AND METHOD FOR PRODUCING SAME

BACKGROUND OF THE INVENTION

The present invention relates to a glass plate with a water-repellent film and to a method for producing such glass plate by forming the water-repellent film on a glass substrate.

Recently, isocyanate silane compound has been proposed to be used for forming a single-layered water-repellent film on a substrate or for forming the top layer of a two-layered water-repellent film thereon. For example, Japanese Patent Examined Publication JP-B-2-25990 discloses a method for forming a silicon oxide film on a substrate by treating the substrate surface with a silane isocyanate compound containing Si-NCO bond in the molecule. In this publication, there are cited, as the silane isocyanate compound, silicon-containing compounds represented by formulas of $Si(NCO)_4$, $R_nSi(NCO)_{4-n}$ and $(RO)_nSi(NCO)_{4-n}$, where R is a hydrocarbon group which may or may not have a substituent, and n is 1, 2 or 3, and condensates of these silicon-containing compounds. Furthermore, there can be used, as the silane isocyanate compound, a silicon compound or a mixture of at least two silicon compounds. Such silicon compound is prepared by condensation of an inorganic silicic acid or a polysiloxane compound with one of the above silicon-containing compounds. Such silicon compound contains at least two NCO groups which are directly bonded to silicon atom.

Japanese Patent Unexamined Publication JP-A-60-219234 discloses a method for forming a multi-layered film on a substrate. This method comprises steps of (a) applying to the substrate a primer composition containing a multifunctional organic isocyanate compound and an acrylic polyol having a hydroxyl value of from 10 to 200 and a NCO/OH ratio of at least 0.6; (b) curing the primer composition by heating and/or drying of the same; and (c) applying to the cured primer composition layer a coating composition containing an organic silicon compound and/or its hydrolysate(s). The organic silicon compound of the step (c) is represented by a general formula of $R^1_aR^2_bSi(OR^3)_{4-a-b}$ where each of $R^1$ and $R^2$ is alkyl group, alkenyl group, allyl group, or a hydrocarbon group having halogen group, epoxy group, amino group, mercapto group, methacryloxy group or cyano group, $R^3$ has a carbon atom number of from 1 to 8 and is alkyl group, alkoxyalkyl group, acyl group or phenyl group, and each of "a" and "b" is 0 or 1.

JP-A-4-342443 discloses an architectural water-repellent article comprising a substrate, a first layer formed on the substrate, and a second layer formed on the first layer. The first layer is prepared from a particular hydrolyzable silane compound or its partial hydrolysate, and the second layer is prepared from a particular isocyanate silane compound.

Hayashi et al. (1994) Journal of the Ceramic Society of Japan 102 [2] 206–209 discloses a water-repellent film formed on a glass plate. This film has a silica undercoating layer and a water-repellent layer formed thereon. The undercoating layer has a thickness of about 100 nm and is prepared by applying tetraisocyanate silane to the glass plate at room temperature. The water-repellent layer is prepared by applying a fluoroalkyl isocyanate silane ($C_9F_{19}C_2H_4Si(NCO)_3$) solution to the undercoating layer, followed by drying at room temperature.

JP-A-6-184527 discloses a water-repellent article having a water-repellent film of a thickness up to 30 nm. This article is prepared by applying a particular water-repellent agent to a substrate. This agent is prepared by a method comprising sequential steps of (a) diluting one or two of a fluoroalkyl-silane compound in an amount of 0–5 parts by weight and a long-chain aliphatic silane compound in an amount of 0–15 parts by weight, with 90–110 parts by weight of a solvent; (b) adding 0.1–5 parts by weight of an acid catalyst to the resultant solution; and (c) adding 0–10 parts by weight of a silicon isocyanate compound to the solution. In this method, there are used at least two of the fluoroalkylsilane, the long-chain aliphatic silane compound and the silicon isocyanate compound.

SUMMARY OF THE INVENTION

It is therefore an object of the present invention to provide a water-repellent glass plate having a water-repellent film which is superior in solar resistance, abrasion resistance, chemical resistance, and adhesion to a glass substrate thereof.

According to the present invention, there is provided a water-repellent glass plate comprising (a) a glass substrate; (b) a first film which is formed on the glass substrate and is made of silica; and (c) a water-repellent second film formed on the first film. The water-repellent glass plate is prepared by a method comprising steps of: (1) applying a first coating liquid containing tetraisocyanate silane to the glass substrate, thereby to form thereon a precursory film; and (2) subjecting the precursory film to a drying at room temperature or to a heating treatment, thereby to prepare the first film; and (3) applying a second coating liquid to the first film, thereby to form thereon the second film. The tetraisocyanate silane of the step (1) is curable at room temperature (e.g., 20–25° C.). The second coating liquid contains an alkoxysilane having at least one fluorocarbon group substituted for at least one hydrogen atom thereof.

In the invention, the tetraisocyanate silane of the first coating liquid is cured by the step (2). The resultant first film becomes a hard silica film, and its surface becomes high in reactivity due to silanol groups formed thereon. With this high reactivity, the first film becomes superior in adhesion to the second film and to the glass substrate. After the step (3), the alkoxysilane of the second coating liquid reacts moderately, for example, with silanol group (SiOH) of the first film and with water in the air, thereby to form the water-repellent second Mm on the first film. With this reaction, alcohol and water may be produced as by-products. These by-products do not become obstacles to the production of the water-repellent glass plate. In contrast to the present invention, if the second coating liquid contains, in place of the alkoxysilane, an alkoxy-free compound, such as $RfSiCl_3$, $RfSi(NCO)_3$ or $RfSi(NH)_{3/2}$ where Rf is a fluorocarbon group, this alkoxy-free compound reacts abruptly with silanol group of the first film and with water in the air, thereby to generate heat and/or hazardous substances such as HCl, HNCO and $NH_3$. According to the invention, the water-repellent second film on the first film is superior in water repellency, solar resistance, and abrasion resistance, while the first and second films do not damage optical characteristics of the glass substrate. Furthermore, the water-repellent glass plate of the invention can be produced by the above-mentioned simple method, using a simple facility, and can be used as architectural and automotive windows, and other various glass articles.

In the invention, the heat treatment of the step (2) can be conducted at a temperature which is higher than room temperature and is up to 700° C., for at least 0.1 min. With this heat treatment, the first film becomes harder, and its surface becomes higher in reactivity. Furthermore, the first film becomes more superior in adhesion to the second film and to the glass substrate and thus contributes to improve the second film in solar resistance and abrasion resistance.

In the invention, the second film may be dried at a temperature of from room temperature to 400° C., for at least 0.1 min., after the step (3). With this drying, it becomes possible to further improve adhesion between the first and second films and that between the first film and the glass substrate.

DESCRIPTION OF THE PREFERRED EMBODIMENTS

Figure 1:
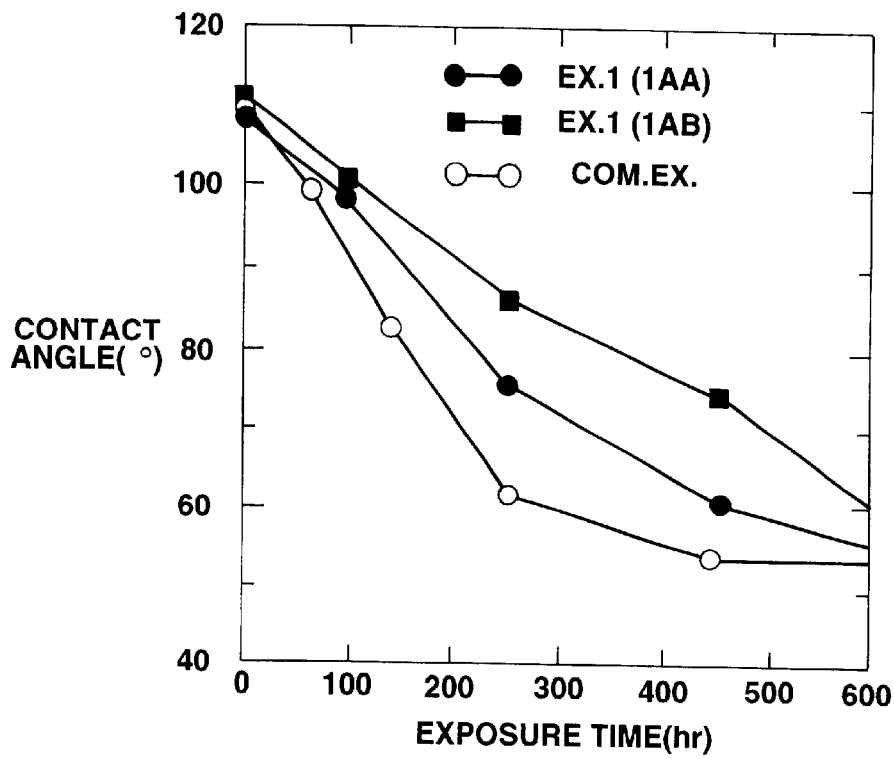
FIG. 1 is a graph showing variation of the contact angle, due to the super-ultraviolet accelerated weathering test, of a water drops disposed on the water-repellent glass plates 1AA and 1AB according to Example 1, which are represented by black marks, and that disposed on another one according to Comparative Example, which is represented by white circles.

In the invention, the first coating liquid for forming the first film on the glass substrate may further contain a first solvent for diluting the tetraisocyanate silane $(Si(NCO)_4)$ contained therein. In the preparation of the first coating liquid, the weight ratio of the tetraisocyanate silane to the first solvent is preferably from 1:999 to 1:4, more preferably from 1:99 to 1:9. In case that the first solvent is n-butyl acetate, this weight ratio is preferably from 1:99 to 1:24 and is more preferably about 1:49. This weight ratio may vary depending on the method for applying the first coating liquid, the thickness of the first film, and the like. The first coating liquid containing the tetraisocyanate silane is in a form of silica sol. When such first coating liquid is applied to the glass substrate surface by rubbing, for example, a cotton pad moistened therewith, against the glass substrate, there can be obtained a first film (silica film) having a thickness of up to 30 nm.

As stated above, the precursory film may be subjected to a heat treatment in the step (2). This heat treatment is conducted for 0.1 min. at a temperature which is higher than room temperature and is up to 700° C., preferably at a temperature of from about 50 to about 670° C. for a period of time of from 0.1 min. to about 24 hr., more preferably at a temperature of from about 200 to about 300° C. for a period of time of from 5 min. to about 1 hr. The heat treatment of the precursory film may be conducted independently or at the same time when the heat bending and/or the tempering of the glass plate is conducted. In the invention, the second film may be dried at a temperature of from room temperature to about 400° C., for at least about 0.1 min.

As stated above, the second coating liquid contains an alkoxysilane having at least one fluorocarbon group and may further contain a long-chain aliphatic silane compound having a carbon atom number of at least 6. The upper limit of this carbon atom number may be about 16. The alkoxysilane of the second coating liquid is preferably represented by a general formula of $(C_nF_{2n+1}C_2H_4)_aSiR^1{}_b(OR^2)_{4-a-b}$ where each of $R^1$ and $R^2$ is an alkyl group, n is an integer of at least 1, "a" is 1, 2 or 3, and "b" is 0, 1 or 2, with a proviso that the total of "a" and "b" is 1, 2 or 3.

In a first case of the second coating liquid, it may have a viscosity of from 0.5 to 6 centipoises and may contain, per 0.1–5 parts by weight of the alkoxysilane, 0–15 parts by weight of the aliphatic silane compound, 90–110 parts by weight of a second solvent, 0.1–5 parts by weight of an acid catalyst, and 0–10 parts by weight of a silicon isocyanate compound. In a second case of the second coating liquid, it may have a solid matter concentration of from 0.1 to 20 wt %, on an oxide basis, and a viscosity of from 0.2 to 7 centipoises.

In the invention, the second film may be dried at a temperature of from room temperature to 400° C. for at least 0.1 min., after the step (3) of applying the second coating liquid to the first film. In the above-mentioned first case of the second coating liquid, it may be dried at a temperature of from room temperature to about 160° C. for at least about 10 min. If this temperature is room temperature in the second case, the period of time is preferably at least about 12 hr. In the above-mentioned second case of the second coating liquid, it may be dried at a temperature of from about 100 to about 400° C. for a period of time of from 0.1 min. to 120 min.

In the invention, the method for applying each of the first and second coating liquids is not particularly limited and may independently be selected from conventional application methods or from combinations of conventional application methods, such as spin coating, dip coating, spraying, flow coating, reverse roller coating, flexography, and other printings.

In the invention, the alkoxysilane of the second coating liquid, having at least one fluorocarbon group, may be at least one compound selected from $CF_3(CH_2)_2Si(OCH_3)_3$, $CF_3(CF_2)_5(CH_2)_2Si(OCH_3)_3$, $CF_3(CF_2)_7(CH_2)_2Si(OCH_3)_3$, and $CF_3(CF_2)_7(CH_2)_2SiCH_3(OCH_3)_2$. The aliphatic silane compound, which is optionally contained in the second coating liquid, may be at least one compound selected from $CH_3(CH_2)_5Si(OCH_3)_3$ and $CH_3(CH_2)_5SiCl_3$.), The silicon isocyanate compound, which is also optionally contained in the second coating liquid, may be at least one compound selected from $(CH_3)_3SiNCO$, $(CH_3)_2Si(NCO)_2$, $CH_3Si(NCO)_3$, $CH_2=CHSi(NCO)_3$, $C_6H_5Si(NCO)_3$, $C_6H_5Si(NCO)_3$, $Si(NCO)_4$, and $C_2H_5OSi(NCO)_3$.

In the invention, nonlimitative examples of the first and second solvents for respectively preparing the first and second coating liquids are esters such as butyl acetate and ethyl acetate, lower alcohols such as ethanol, propanol and butanol, ketones such as acetone, methyl ethyl ketone and methyl isobutyl ketone, cellosolves such as methyl cellosolve and ethyl cellosolve, aromatic hydrocarbons such as toluene and xylene, and aliphatic hydrocarbons such as n-butane and n-hexane.

In the invention, nonlimitative examples of the above-mentioned acid catalyst used for preparing the second coating liquid are inorganic acids such as nitric acid, hydrochloric acid and sulfuric acid, dicarboxylic acids such as oxalic acid and hexafluoroglutaric acid, organic acids such as p-toluenesulfonic acid and trifluoroacetic acid.

In the invention, the glass substrate is not particularly limited in color, color tone, functionality, shape and the like. In fact, it may be colorless or colored (e.g., green or bronze color), as long as it is transparent. Furthermore, the glass substrate may be a curved or flat glass plate, a single glass plate, a laminated glass plate, a double glazing unit, or a tempered glass plate. A functional thin film other than that of the present invention is optionally formed thereon. The glass substrate may be a transparent organic glass plate, too.

The following nonlimitative examples are illustrative of the present invention.

EXAMPLE 1

At first, a clear float glass substrate having widths of about 100 mm and a thickness of about 2 mm was washed with neutral detergent, then with water, and then with alcohol, and then dried, followed by wiping with acetone.

Then, the first coating liquid A was prepared by mixing 1 part by weight of tetraisocyanate silane ($Si(NCO)_4$) made by Matsumoto Seiyaku Co. with 49 parts by weight of butyl acetate ($CH_3COOC_4H_9$). Then, the first coating liquid A was applied to the glass substrate surface by rubbing a cotton pad moistened therewith, against the glass substrate, thereby to form a precursory film thereon. Then, the precursory im was dried at room temperature, thereby to form thereon the fist film 1A (silica film) having a thickness of about 20 nm.

Then, the second coating liquid A was prepared as follows. At first, a first mixture was prepared by mixing together 1 part by weight of heptadecafluorodecyl-trimethoxysilane ($CF_3(CF_2)_7(CH_2)_2Si(OCH_3)_3$) made by Toshiba Silicone Co., 100 parts by weight of ethanol ($C_2H_5OH$), and 2 parts by weight of oxalic acid ($HOOCCOOH\ 2H_2O$). Separately, a second mixture was prepared by mixing 1 part by weight of methyltriisocyanate silane ($CH_3Si(NCO)_3$) made by Matsumoto Seiyaku Co. and 9 parts by weight of ethyl acetate ($CH_3COOC_2H_5$). Then, the second coating liquid A was prepared by mixing 103 parts by weight of the first mixture with 10 parts by weight of the second mixture.

Then, the second coating liquid A was applied to the first film 1A by allowing several drops of the second coating liquid A to fall on the first film 1A and then by rubbing a cotton pad against the first film 1A in a manner to spread the drops of the second coating liquid A on the first film 1A This application was repeated once again. Then, the coated glass substrate was allowed to stand still at room temperature for about 24 hr for drying of the second coating liquid A, thereby to prepare the water-repellent glass plate 1AA of the present invention having the second film 1A of a thickness of about 20 nm, formed on the first film 1A.

Separately, the second coating liquid B was prepared by mixing together 1 part by weight of the same heptadecafluorodecyl-trimethoxysilane as above, 25 parts by weight of isopropyl alcohol ($(CH_3)_2CHOH$), and 1 part by weight of 60% nitric acid. Then, the second coating liquid B was applied to the first film 1A in the same maimer as above, and then the coated glass substrate was heated at about 140° C. for about 30 min., thereby to prepare the water-repellent glass plate 1AB of the present invention having the second film 1B formed on the first film 1A.

Then, each of the water-repellent glass plates 1AA and 1AB was subjected to the following evaluation tests. To evaluate its water repellency, the contact angle of water drop on the second film 1A or 1B, the initial contact angle, was measured in the atmosphere of about 25° C., by a CA-X type contact angle meter made by Kyowa Kaimen Kagaku Co. The results are shown in FIG. 1.

Weatherability (solar resistance) of the glass plates 1AA and 1AB was evaluated by a super UV accelerated weatherability test, using SUV-W11-type super UV accelerated weatherability tester of Iwasaki Denki Co. In this test, the second films 1A and 1B were exposed to the super UV rays of about 76 $mW/cm^2$ for certain periods of time shown in FIG. 1, at about 50° C. and a relative humidity of about 20%. After each period of time shown in FIG. 1, the contact angle of water drop disposed on the second film 1A or 1B was measured in the same manner as above The results are shown in FIG. 1.

EXAMPLE 2

At first, the first film 2A was formed on the glass substrate, using the first coating liquid A of Example 1, in the same manner as that of forming the first film 1A of Example 1, except in that the precursory film was subjected to a heat treatment of 250° C. for 30 min, in stead of the drying at room temperature.

Then, a cotton pad moistened with the second coating liquid B of Example 1 was rubbed by hand against the first film 2A, thereby to coat the first film 2A therewith. Then, the coated glass substrate was heated at about 140° C. for about 30 min., thereby to form on the first film 2A the second film 2B having a thickness of about 20 nm. Then, the surface of the second film 2B was wiped with a cotton pad moistened with isopropyl alcohol to remove an excess of the second film 2B, thereby to prepare the water-repellent glass plate 2AB.

Besides the first coating liquid A of Example 1, the first coating liquids B–E were respectively prepared by the same manner as that of the first coating liquid A except in that the amount of butyl acetate was changed to 74, 24, 99 and 199 parts by weight, per 1 part by weight of tetraisocyanate silane. Then, the first films 2B–2E were respectively prepared from the first coating liquids B–E in the same manner as that of the first film 2A. Then, the water-repellent glass plates 2BB–2EB were respectively prepared by applying the second coating Liquid B to the first films 2B–2E, in the same manner as that of preparing the water-repellent glass plate 2AB.

Figure 2:
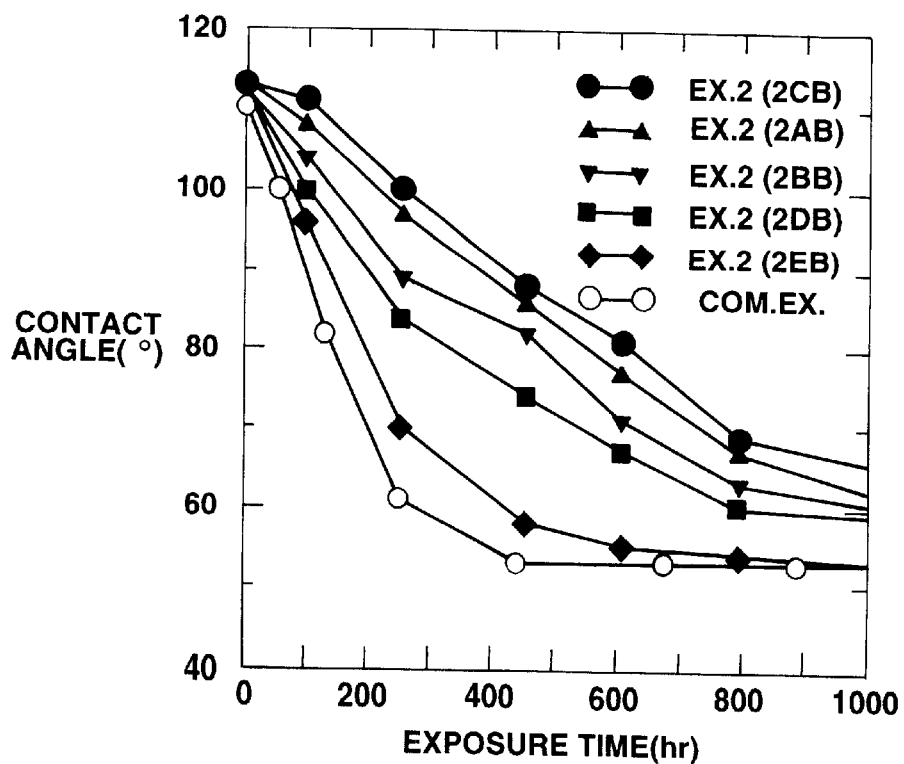
FIG. 2 is a graph similar to FIG. 1, but showing that disposed on those 2AB–2EB according to Example 2, which are represented by black marks, and that according to Comparative Example, which is represented by white circles.

The glass plates 2AB–2EB were subjected to the same evaluation test as those of Example 1. The results are shown in FIG. 2.

Comparative Example

In this comparative example, the second film 1A of Example 1 was formed directly on the glass substrate by the same method as that of Example 1, using the second coating liquid B, thereby to prepare the water-repellent glass plate. In other words, the first film was omitted. The results of the evaluation tests until 600 hr exposure to the super UV rays are shown in FIG. 1, and those until 1,000 hr exposure thereto are respectively shown in FIGS. 2–4.

EXAMPLE 3

At first, the first coating liquid A of Example 1 was applied to four glass substrates each being the same as that of Example 1, in the same manner as that of Example 1, thereby to form four precursory films thereon. Then, these precursory films were respectively subjected to first to fourth heat treatments, which are respectively of about 100° C. for about 1 hr, of about 200° C. for about 10 min., of about 200° C. for about 1 hr, and of about 300° C. for about 10 min, thereby to prepare the four first films $3A_1$–$3A_4$ (i.e., $3A_1$, $3A_2$, $3A_3$ and $3A_4$). Separately, the first coating liquid A of Example 1 was applied to two glass substrates each being the same as that of Example 1, thereby to form two precursory films thereon. Then, these precursory films were respectively subjected to fifth and sixth heat treatments, which are respectively of about 640° C. for about 5 min. and of about 740° C. for about 4 min, thereby to prepare the two first films $3A_5$ and $3A_6$.

Figure 3:
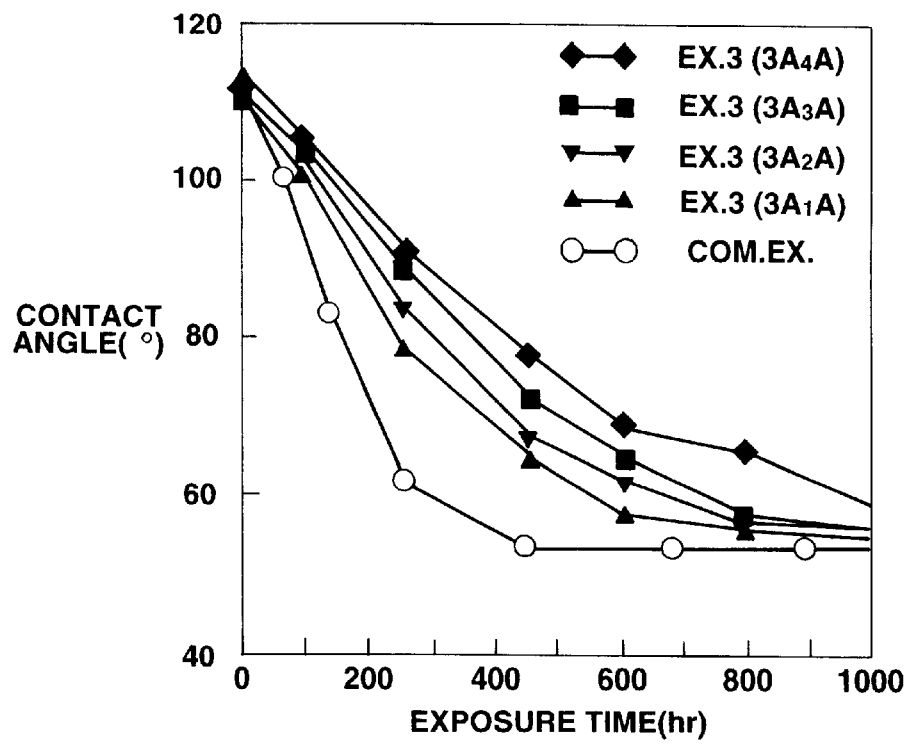
FIG. 3 is a graph similar to FIG. 1, but showing that disposed on those $3A_1A$–$3A_4A$ according to Example 3, which are represented by black marks, and that according to Comparative Example 1, which is represented by white circles.

Then, the second coating liquid A of Example 1 was respectively applied to the first films $3A_1$, $3A_2$, $3A_3$ and $3A_4$, followed by the drying, by the same methods as those of Example 1, thereby to prepare the water-repellent glass plates $3A_1A$, $3A_2A$, $3A_3A$ and $3A_4A$, each having the second film having a thickness of about 20 nm. These glass plates were subjected to the same evaluation tests as those of Example 1. The results are shown in FIG. 3. It is understood from FIG. 3 that the water-repellent glass plate was improved in weather resistance (solar resistance) by increasing the temperature of and the period of time of the heat treatment on the first film.

EXAMPLE 4

Figure 4:
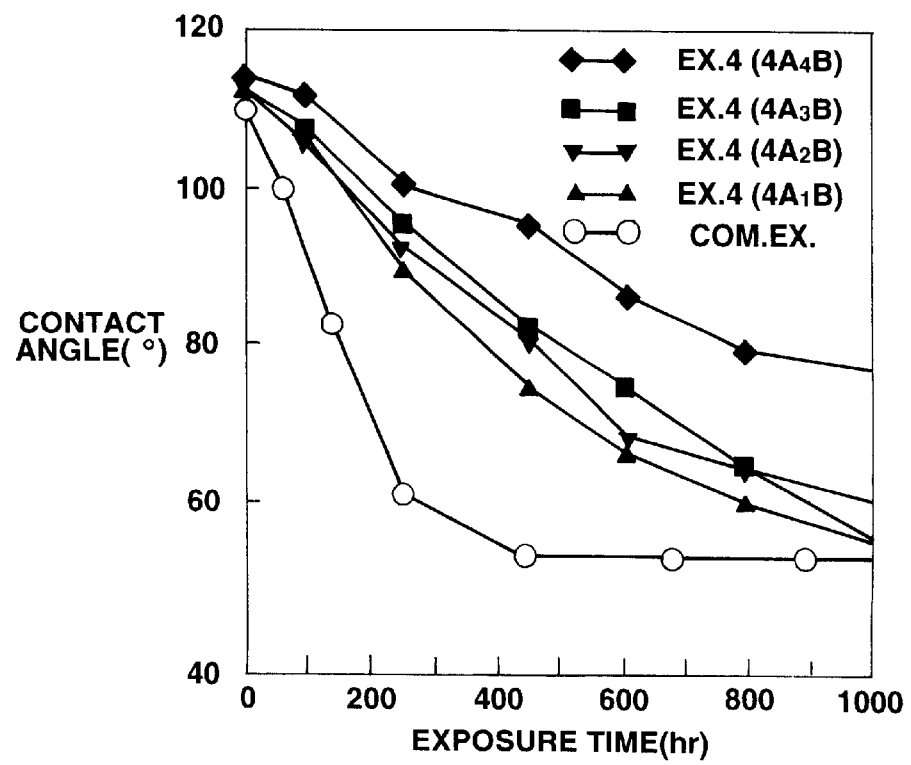
FIG. 4 is a graph similar to FIG. 1, but showing that disposed on those $4A_1B$–$4A_4B$ according to Example 4, which are represented by black marks, and that according to Comparative Example 1, which is represented by white circles.

At first, the first coating liquid A of Example 1 was applied to six glass substrates each being the same as that of Example 1, in the same manner as that of Example 1, thereby to form six precursory films thereon. Then, these precursory films were respectively subjected to the first to sixth heat treatments of Example 3, thereby to prepare the six first films $4A_1$–$4A_6$ Then, the second coating liquid B of Example 1 was applied to each of the first films $4A_1$–$4A_6$ in the same manner as that of Example 2. Then, each of the coated glass substrates was heated at 140° C. for about 30 min, thereby to respectively form on the first films $4A_1$–$4A_6$ the second films 4B, each having a thickness of about 20 nm. Then, the surface of each of the second films 4B was wiped in the same manner as that of Example 2, thereby to prepare the water-repellent glass plates $4A_1B$–$4A_6B$. These six glass plates $4A_1B$–$4A_6B$ were subjected to the same evaluation tests as those of Example 1. The results are shown in FIG. 4 and Table. In fact, FIG. 4 shows only the results of the evaluation tests on the four glass plates $4A_1B$–$4A_4B$. In Table, there are shown only first values of the initial contact angle of water drop, second values of the contact angle thereof after 250 hr exposure to the super UV rays, and third values of that after 500 hr exposure thereto, with respect to all of the six glass plates $4A_1B$–$4A_6B$. The first and second values shown in Table were obtained by the actual measurements in the evaluation tests. In contrast, the third values shown in Table were not obtained thereby, but are estimated values. That is, the third values of the glass plates $4A_1B$–$4A_4B$ and $4A_5B$–$4A_6B$ of Table were respectively obtained from the graph of FIG. 4 and from another graph similar to that of FIG. 4.

TABLE

| Glass Plates Symbols of Example 4 | Heating on Precursory Film | Initial Contact Angle (°) | Contact Angle after 250 hr Exposure(°) | Contact Angle after 500 hr Exposure (°) |
| --- | --- | --- | --- | --- |
| $4A_1B$ | 100° C., 1 hr | 111 | 90 | 72 |
| $4A_2B$ | 200° C., 10 min | 112 | 93 | 77 |
| $4A_3B$ | 200° C., 1 hr | 112 | 96 | 80 |
| $4A_4B$ | 300° C., 10 min | 113 | 101 | 93 |
| $4A_5B$ | 620° C., 5 min | 109 | 97 | 74 |
| $4A_6B$ | 740° C., 4 min | 108 | 91 | 69 |

What is claimed is:
1. A water-repellent glass plate comprising:
   (a) a glass substrate;
   (b) a first film being made of silica; and
   (c) a water-repellent second film formed on said first film, wherein said water-repellent glass plate is prepared by a method comprising steps of:
      (1) applying a first coating liquid containing tetraisocyanate silane to said glass substrate, thereby to form thereon a precursory film, said tetraisocyanate silane being curable at room temperature; and
      (2) subjecting said precursory film to a heat treatment at a temperature of about 200–300° C. for from about 10 minutes to about 1 hour, thereby to prepare said first film; and
      (3) applying a second coating liquid to said first film, thereby to form said second film on said first film, said second coating liquid containing an alkoxysilane having at least one fluorocarbon group.

2. A glass plate according to claim 1, wherein said second coating liquid further contains an aliphatic silane compound having at least 6 carbon atoms.

3. A glass plate according to claim 1, wherein said alkoxysilane of the step (3) is represented by a general formula of $(C_nF_{2n+1}C_2H_4)_aSiR^1{}_b(OR^2)_{4-a-b}$ where each of $R^1$ and $R^2$ is independently an alkyl group, n is an integer of at least 1, "a" is 1, 2 or 3, and "b" is 0, 1 or 2, with a proviso that the total of "a" and "b" is 1, 2 or 3.

4. A glass plate according to claim 1, wherein said first film has a thickness of up to 30 nm.

5. A method for producing a glass plate having (a) a glass substrate; (b) a first film formed on said glass substrate, said first film formed on said glass substrate, said first film being made of silica; and (c) a water-repellent second film formed on said first film, said method comprising steps of:
   (1) applying a first coating liquid containing tetraisocyanate silane to said glass substrate,
   (2) subjecting said precursory film to a heat treatment at a temperature of about 200–300° C. for from about 10 minutes to about 1 hour, thereby to prepare said first film; and
   (3) applying a second coating liquid to said first film, thereby to form thereon said second film, said second coating liquid containing an alkoxysilane having at least one fluorocarbon group.

6. A method according to claim 5, wherein said second coating liquid further contains an aliphatic silane compound having at least 6 carbon atoms.

7. A method according to claim 5, wherein said alkoxysilane of the step (3) is represented by a general formula of $(C_nF_{2n+1}C_2H_4)_aSiR^1{}_b(OR^2)_{4-a-b}$ where each of $R^1$ and $R^2$ is an alkyl group, n is an integer of at least 1, "a" is 1, 2 or 3, and "b"is 1, 2 or 3.

8. A method according to claim 5, wherein said first coating liquid further contains a first solvent, and a weight ratio of said tetrasaisocyanate silane to said first solvent is from 1:999 to 1:4.

9. A method according to claim 8, wherein said weight ratio is from 1:99 to 1:24.

10. A method according to claim 9, wherein said weight ratio is about 1:49.

11. A method according to claim 5, wherein said second coating liquid has a solid matter concentration of from 0.1 20 wt% on an oxide basis, and has a viscosity of from 0.2 to 7 centipoises.

12. A method according to claim 5, wherein said second coating liquid further contains, per 0.1–5 parts by weight of said alkoxysilane contained therein, 0–15 parts by weight of an aliphatic silane compound having at least 7 carbon atoms, 90–100 parts by weight of a second solvent, 0.1–5 parts by weight of an acid catalyst, and 0–10 parts by weight of a silicon isocyanate compound, and wherein said second coating liquid has viscosity of from 0.5 to 6 centipoises.

13. A method according to claim 5, wherein, after the step (3), said second film is dried at a temperature of from room temperature to 400° C. for at least 0.1 min.

14. A method according to claim 13, wherein said second film is dried at a temperature of from 100 to 400° C. for a period of time of from 0.1 to 120 min.

15. A method according to claim 13, wherein said second film is drief at a temperature of from room temperature to 160° C. for at least 10 min.

16. A method according to claim 13, wherein said second film is dried at room temperature for at least 12 hr.

17. A method according to claim 5, wherein said alkoxysilane of the step (3) is at least one compound selected from the group consisting of $CF_3(CH_2)_2Si(OCH_3)_3$, $CF_3(CF_2)_5(CH_2)_2Si(OCH_3)_3$, $CF_3(CF_2)_7(CH_2)_2Si(OCH_3)_3$, and $CF_3(CF_2)_7(CH_2)_2SiCH_3(OCH_3)_2$.

18. A method according to claim 12, wherein said silicon isocyanate compound is at least one compound selected from the group consisting of $(Ch_3)_3SiNCO$, $(CH_3)_3Si(NCO)_2$, $CH_3Si(NCO)_3$, $CH_2=CHSi(NCO)_3$, $C_6H_5Si(NCO)_3$, $Si(NCO)_4$, and $C_2H_5OSi(NCO)_3$.

19. A method for producing a glass plate having (a) a glass substrate; (b) a first film formed on said glass substrate, said first film being made of silica; and (c) a water-repellent second film formed on said first film, said method comprising steps of:

(1) applying a first coating liquid containing tetraisocyanate silane to said glass substrate, thereby to form thereon a precursory film, said tetraisocyanate silane being curable at room temperature; and (2) subjecting said precursory film to a heat treatment at a temperature of about 200–300° C. for from about 10 minutes to about 1 hour, thereby to prepare said first film; and (3) applying a second coating liquid to said first film, thereby to form thereon said second film, said second coating liquid containing an alkoxysilane having at least one fluorocarbon group and at least one an aliphatic silane compound selected from the group consisting of $CH_3(CH_2)_5Si(OCH_3)_3$ and $CH_3(CH_2)_5SiCl_3$.

* * * * *